United States Patent
Di Giovanni et al.

(10) Patent No.: US 11,248,119 B2
(45) Date of Patent: Feb. 15, 2022

(54) EMULSION, COMPOSITION COMPRISING SAME, FILM FORMED THEREWITH, AND RELATED METHODS

(71) Applicant: DOW SILICONES CORPORATION, Midland, MI (US)

(72) Inventors: Gina Di Giovanni, Haine-Saint-Pierre (BE); Fabrizio Galeone, Epinois (BE); Michal Hrebičík, Maršovice (CZ); Pierre Léger, Antoing (BE); David Pierre, BXL (BE); Stephane Ugazio, Soignies (BE)

(73) Assignee: DOW SILICONES CORPORATION, Midland, MI (US)

( * ) Notice: Subject to any disclaimer, the term of this patent is extended or adjusted under 35 U.S.C. 154(b) by 436 days.

(21) Appl. No.: 16/483,588

(22) PCT Filed: Feb. 6, 2018

(86) PCT No.: PCT/US2018/017013
§ 371 (c)(1),
(2) Date: Aug. 5, 2019

(87) PCT Pub. No.: WO2018/145069
PCT Pub. Date: Aug. 9, 2018

(65) Prior Publication Data
US 2019/0382581 A1   Dec. 19, 2019

Related U.S. Application Data

(60) Provisional application No. 62/454,991, filed on Feb. 6, 2017, provisional application No. 62/591,500, filed on Nov. 28, 2017.

(51) Int. Cl.
| | |
|---|---|
| C08L 83/04 | (2006.01) |
| B29C 41/00 | (2006.01) |
| C08G 77/04 | (2006.01) |
| C08J 3/11 | (2006.01) |
| C08J 5/18 | (2006.01) |
| C08K 5/41 | (2006.01) |
| C09D 183/04 | (2006.01) |
| C08J 3/05 | (2006.01) |
| B29K 83/00 | (2006.01) |
| B29L 7/00 | (2006.01) |
| C08G 77/00 | (2006.01) |

(52) U.S. Cl.
CPC ............ *C08L 83/04* (2013.01); *B29C 41/003* (2013.01); *C08G 77/04* (2013.01); *C08J 3/05* (2013.01); *C08J 3/11* (2013.01); *C08J 5/18* (2013.01); *C08K 5/41* (2013.01); *C09D 183/04* (2013.01); *B29K 2083/00* (2013.01); *B29L 2007/008* (2013.01); *C08G 77/70* (2013.01); *C08J 2383/04* (2013.01); *C08J 2423/12* (2013.01); *C08L 2201/52* (2013.01)

(58) Field of Classification Search
CPC .... C08L 2205/02; C08L 2205/025; C08J 3/05
See application file for complete search history.

(56) References Cited

U.S. PATENT DOCUMENTS

| | | |
|---|---|---|
| 5,973,061 A | 10/1999 | Feder et al. |
| 6,737,444 B1 | 5/2004 | Liu |
| 7,385,001 B2 | 6/2008 | Shim et al. |
| 7,879,943 B2 | 2/2011 | Osawa |
| 8,470,925 B2 | 6/2013 | Liu et al. |
| 2003/0235548 A1 | 12/2003 | Lu |
| 2006/0041026 A1 | 2/2006 | Mahr et al. |
| 2007/0116969 A1 | 5/2007 | Liu |
| 2007/0128962 A1* | 6/2007 | Serobian .............. C09D 183/04 442/249 |
| 2009/0226623 A1 | 9/2009 | Liu |
| 2010/0093598 A1 | 4/2010 | Davio et al. |
| 2014/0357773 A1 | 12/2014 | Liles et al. |
| 2020/0010747 A1* | 1/2020 | French ................... C08G 77/14 |

FOREIGN PATENT DOCUMENTS

| | | |
|---|---|---|
| CN | 1658829 A | 8/2005 |
| CN | 1737061 A | 2/2006 |
| CN | 1863845 A | 11/2006 |
| CN | 101522758 A | 9/2009 |
| WO | 2008066746 A2 | 6/2008 |
| WO | 2013165482 A1 | 11/2013 |

OTHER PUBLICATIONS

International Search Report for PCT/US2018/017013 dated Apr. 5, 2018, 5 pages.

* cited by examiner

*Primary Examiner* — Marc S Zimmer
(74) *Attorney, Agent, or Firm* — Warner Norcross + Judd LLP

(57) ABSTRACT

An emulsion is disclosed which comprises a non-aqueous phase comprising a solid silicone resin and a siloxane carrier vehicle having an average of at least one silicon-bonded functional group per molecule and capable of carrying the solid silicone resin, an aqueous phase comprising water, and a surfactant, wherein the emulsion is substantially free from organic solvents. Various methods relating to the emulsion and end uses thereof are also disclosed. A composition comprising the emulsion and an organic binder, as well as related methods, are further disclosed.

18 Claims, No Drawings

EMULSION, COMPOSITION COMPRISING SAME, FILM FORMED THEREWITH, AND RELATED METHODS

CROSS-REFERENCE TO RELATED APPLICATIONS

This application is the National Stage of International Application No. PCT/US2018/017013 filed on 06 Feb. 2018, which claims priority to and all advantages of U.S. Patent Application No. 62/454,991 filed on 06 Feb. 2017 and of U.S. Patent Application No. 62/591,500 filed 28 Nov. 2017, the contents of which are hereby incorporated by reference.

FIELD OF THE INVENTION

The present invention generally relates to an emulsion and, more specifically, to an emulsion which forms films having excellent physical properties, and to methods of preparing the emulsion and films with the emulsion.

DESCRIPTION OF THE RELATED ART

Organopolysiloxanes are well known in the art and have numerous end use applications. For example, organopolysiloxanes are utilized in various compositions in myriad industries. Commonly, these compositions are waterborne, and organopolysiloxanes do not readily disperse or solubilize in water. As such, organopolysiloxanes are commonly delivered via emulsions, e.g. oil in water emulsions. Silicone emulsions can be made by various processes, such as mechanical emulsification or emulsion polymerization.

Typically, organopolysiloxanes are dispersed in an organic solvent or silicone oil. Organic solvents can be undesirable and introduce further cost, particularly when such organic solvents must be volatilized and driven from the emulsion in end use applications, e.g. if preparing films or coatings. Depending on the organic solvent utilized, this also may give rise to health and environmental concerns. Further, silicone oils are generally undesirably incompatible with other components when preparing films.

SUMMARY OF THE INVENTION

The present invention provides an emulsion. The emulsion comprises a non-aqueous phase, an aqueous phase comprising water, and a surfactant. The non-aqueous phase comprises a solid silicone resin and a siloxane carrier vehicle capable of carrying the solid silicone resin. The siloxane carrier vehicle has an average of at least one silicon-bonded functional group per molecule. The emulsion is substantially free from organic solvents.

A method of preparing the emulsion is also disclosed. This method comprises combining the solid silicone resin and the siloxane carrier vehicle to give a non-aqueous composition. This method also comprises combining the non-aqueous composition, water, and the surfactant to give a mixture. Finally, this method comprises shearing the mixture, thereby preparing the emulsion.

The present invention also provides a method of preparing a film with the emulsion. The method comprises applying the emulsion on a substrate, and forming the film on the substrate from the emulsion. The present invention also provides the film formed with the emulsion in accordance with the method.

Further, the present invention provides a composition. The composition comprises the emulsion and an organic binder. A method of preparing a film with the composition is also provided, the method comprising applying the composition on a substrate, and forming the film on the substrate from the composition. The present invention also provides the film formed with the composition in accordance with the method.

DETAILED DESCRIPTION OF THE INVENTION

The present invention provides an emulsion, a method of preparing the emulsion, and a method of forming a film with the emulsion, as described in detail below. The present invention also provides a composition comprising the emulsion and a method of forming a film with the composition. Each of the emulsion and composition has excellent physical properties and is particularly suited for forming such films. For example, the films have desirable properties, including heat resistance, durability and water repellency. However, the emulsion and composition are not so limited and may be utilized in end use applications other than the preparation of films. For example, the emulsion and/or composition may be utilized in or as a personal care composition.

The emulsion comprises a non-aqueous phase and an aqueous phase. Typically, the non-aqueous phase is a discontinuous phase in the emulsion, and the aqueous phase is a continuous phase. However, the non-aqueous phase may be the continuous phase, with the aqueous phase being the discontinuous phase, based on the relevant amounts of components therein, as described below.

The non-aqueous phase of the emulsion comprises a solid silicone resin. "Solid silicone resin," as used herein, means in its pure form a siloxane resin which is solid at room temperature and/or ambient conditions. The solid silicone resin may be, for example, in the form of a powder, a particle, a flake, a pellet, a spheroid, a cube, or combinations of different forms. As understood by one of skill in the art, solid silicone resins may be dispersed in or solubilized by a vehicle, which are still within the scope of solid silicone resins. For example, solid silicone resins which may be dispersed in a vehicle and thus in liquid form at ambient conditions are still within the scope of "solid silicone resins" as used herein. Typically, the solid silicone resin has a glass transition temperature (Tg) that is greater than 25° C.

In certain embodiments, the solid silicone resin has the general formula $(R^1R^2R^3SiO_{1/2})_w(R^4R^5SiO_{2/2})_x(R^6SiO_{3/2})_y(SiO_{4/2})_z$, where $R^1$-$R^6$ are independently selected from H, OH, or any organic group, e.g. substituted or unsubstituted hydrocarbyl groups, alkoxy groups, amino groups, acetoxy groups, and aminoxy groups, and w, x, y and z are independently from $\geq 0$ to $\leq 1$, with the provisos that y and z are not simultaneously 0 and w+x+y+z=1. Subscript y indicates T siloxy units, and subscript z indicates Q siloxy units.

Alternatively, the solid silicone resin may be designated by the average of the siloxy units as follows; $R_n SiO_{(4-n)/2}$, where R is independently any substituent, e.g. any of $R^1$-$R^6$ above, including organic groups. The value of n in the average formula may be used to characterize the solid silicone resin. For example, an average value of n=1 would indicate a predominate concentration of $(RSiO_{3/2})$ siloxy units in the solid silicone resin, while n=2 would indicate a predominance concentration of $(R_2SiO_{2/2})$ siloxy units in the solid silicone resin (and thus the solid silicone resin would include a linear portion). In this average formula for the solid silicone resin, n is typically <1.8.

The amount of each siloxy unit present in the solid silicone resin is expressed as a mole fraction (through subscript w, x, y and z) of the total number of moles of all M, D, T, and Q siloxy units present in the solid silicone resin. Any such formula used herein to represent the solid silicone resin does not indicate structural ordering of the various siloxy units therein. Rather, such formulae are meant to provide a convenient notation to describe the relative amounts of the siloxy units in the solid silicone resin, as per the mole fractions described above via the subscripts w, x, y and z. The mole fractions of the various siloxy units in the solid silicone resin, as well as the silanol content, if any, may be readily determined by $^{29}$Si NMR techniques.

When the solid silicone resin comprises predominately T siloxy units, i.e., as subscript y approaches 1, the solid silicone resin is typically referred to as a "silsesquioxane resin". When the solid silicone resin comprises M and Q siloxy units, the solid silicone resin is often referred to as a "MQ resin". The solid silicone resin may be a T resin, a DT resin, an MT resin, an MDT resin, a DTQ resin, a MTQ resin, a MDTQ resin, a DQ resin, an MQ resin, a DTQ resin, an MTQ resin, or an MDQ resin. Two or more different types of silicone resins may be utilized in combination with one another.

In certain embodiments, the solid silicone resin comprises an MQ resin. MQ resins comprise $(R^1R^2R^3SiO_{1/2})$ and $(SiO_{4/2})$ siloxy units. These siloxy units are indicated by subscripts w and z in the general formula above. In certain embodiments, the solid silicone resin consists essentially of these units. By "consist essentially of" with reference to the M and Q units in the solid silicone resin, it is meant that $w+z \geq 0.8$, alternatively $w+z \geq 0.85$, alternatively $w+z \geq 0.9$, alternatively $w+z \geq 0.95$, alternatively $w+z \geq 0.96$, alternatively $w+z \geq 0.97$, alternatively $w+z \geq 0.98$, alternatively $w+z \geq 0.99$, alternatively $w+z=1$. Because $w+x+y+z=1$, when $w+z<1$, the balance is attributable to the presence of at least some molar fraction of D and/or T siloxy units. As such, the MQ resin may include at least some D and/or T siloxy units based on the subscripts and mole fractions above. In other embodiments, the MQ resin consists of M and Q siloxy units.

As introduced above, $R^1$-$R^3$ are not limited and are independently selected, including relative to the description below. For example, $R^1$-$R^3$ may independently be selected from H, OH, or any organic group, e.g. substituted or unsubstituted hydrocarbyl groups, alkoxy groups, amino groups, acetoxy groups, and aminoxy groups.

The hydrocarbyl group(s), if any, represented by $R^1$-$R^3$ may independently be substituted or unsubstituted, and may be aliphatic, aromatic, cyclic, alicyclic, etc. Moreover, the hydrocarbyl group(s) represented by $R^1$-$R^3$ may include one or more heteroatoms replacing carbon atoms, e.g. N, S, or O may replace C in the hydrocarbyl group(s) represented by $R^1$-$R^3$. The term "substituted" as used in relation to a hydrocarbyl group means, unless indicated otherwise, one or more hydrogen atoms in the hydrocarbyl group has been replaced with another atom or substituent.

Unsubstituted aliphatic hydrocarbyl groups are exemplified by, but not limited to, alkyl groups such as methyl, ethyl, propyl, pentyl, octyl, decyl, dodecyl, undecyl, and octadecyl; cycloalkyl groups such as cyclopentyl and cyclohexyl; aryl groups such as phenyl, tolyl, xylyl, and benzyl; and aralkyl groups such as 2-phenylethyl.

Substituted hydrocarbyl groups have one or more hydrogen atoms replaced with another atom or substituent, for example, a halogen atom such as chlorine, fluorine, bromine, or iodine; an oxygen atom or an oxygen atom containing group such as an acrylic, methacrylic, alkoxy, or carboxyl group; a nitrogen atom or a nitrogen atom containing group such as an amino, amido, or cyano group; or a sulphur atom or sulphur atom containing group such as a mercapto group.

Substituted groups are exemplified by halogenated hydrocarbon groups including chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl; and other monovalent organic groups such as hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl.

In some embodiments, at least some, alternatively all, of the $R^1$-$R^3$ groups are methyl groups. For example, in certain embodiments, the solid silicone resin is non-reactive. In such embodiments, and when $R^1$-$R^3$ are methyl, the MQ resin may be referred to as a trimethylsiloxysilicate. In other embodiments, the solid silicone resin is reactive and may undergo further reaction or crosslinking, e.g. when preparing a film with the emulsion, as described below.

The MQ resin may have a molar ratio of M siloxy units to Q siloxy units (M:Q) of from >0:1 to 10:1, e.g. from 0.5:1 to 1.5:1. These mole ratios may be measured by $Si^{29}$ NMR spectroscopy. This technique is capable of quantitatively determining the concentration of M and Q siloxy units derived from the solid silicone resin, in addition to the total hydroxyl content of the solid silicone resin.

In various embodiments, the MQ resin contains 2.0% or less, alternatively 0.7% or less, alternatively 0.3% or less (by weight based on the total weight of the MQ resin), of terminal units represented by the formula $X''SiO_{3/2}$, where $X''$ represents hydroxyl or a hydrolyzable group such as alkoxy such as methoxy and ethoxy; alkenyloxy such as isopropenyloxy; ketoximo such as methyl ethyl ketoximo; carboxy such as acetoxy; amidoxy such as acetamidoxy; and aminoxy such as N,N-dimethylaminoxy. Silicon-bonded hydroxyl groups formed during preparation of the solid silicone resin may be converted to trihydrocarbylsiloxy groups or a hydrolyzable group by reacting the solid silicone resin with a silane, disiloxane or disilazane containing the appropriate terminal group. Silanes containing hydrolyzable groups may be added in excess of the stoichiometric quantity of the silicon-bonded hydroxyl groups of the solid silicone resin. The MQ resin can also be "capped" wherein residual hydroxy groups are reacted with additional M groups. Alternatively, the MQ resin may be "uncapped." The concentration of silanol or hydrolyzable groups present in the solid silicone resin can be determined using FTIR, as understood in the art.

The molecular weight of the MQ resin can depend on many factors, including the siloxane carrier vehicle utilized, whether the solid silicone resin is reactive or non-reactive, desired characteristics of the emulsion or the resulting film, etc. In certain embodiments, the MQ resin has a molecular weight of from greater than 0 to 10,000, alternatively from 500 to 7,500, alternatively from 1,000 to 5,000, Daltons. However, other MQ resins having higher molecular weights may also be utilized and are contemplated, e.g. MQ resins having a molecular weight of from 10,000 to 1,000,000 Daltons.

The MQ resin can be prepared by any suitable method. MQ resins have been prepared by cohydrolysis of the corresponding silanes or by silica hydrosol capping methods known in the art. Briefly stated, the method involves reacting a silica hydrosol under acidic conditions with a hydrolyzable triorganosilane such as trimethylchlorosilane, a siloxane such as hexamethyldisiloxane, or a combination thereof, and recovering a product comprising M and Q siloxy units (i.e., the MQ resin).

The intermediates used to prepare the MQ silicone resin may be a triorganosilane (including a silicon-bonded hydrolyzable group) and either a silane with four hydrolyzable groups such as halogen, alkoxy or hydroxyl, or an alkali metal silicate such as sodium silicate.

Various suitable MQ resins are commercially available from sources such as Dow Corning Corporation of Midland, Mich., U.S.A., Momentive Performance Materials of Albany, N.Y., U.S.A., and Bluestar Silicones USA Corp. of East Brunswick, N.J., U.S.A. For example, DOW CORNING® MQ-1600 Solid Resin, DOW CORNING® MQ-1601 Solid Resin, and DOW CORNING® 1250 Surfactant, DOW CORNING® 7466 Resin, and DOW CORNING® 7366 Resin, all of which are commercially available from Dow Corning Corporation, are suitable for use in the methods described herein. Alternatively, a resin containing M, T, and Q units may be used, such as DOW CORNING® MQ-1640 Flake Resin, which is also commercially available from Dow Corning Corporation. Such resins may be supplied in organic solvent, which may be separated from, volatilized from, evaporated from, stripped from or otherwise removed from the MQ resin prior to or during formation of the emulsion. Alternatively, such organic solvents may be present in such a nominal amount that the emulsion is nonetheless substantially free thereof, as described and defined below.

In these or other embodiments, the solid silicone resin comprises, alternatively is, a silsesquioxane resin. The silsesquioxane resin may alternatively be referred to as a T resin, and comprises T siloxy units, i.e., ($R^6SiO_{3/2}$) units, where $R^6$ is defined above. These siloxy units are indicated by subscript y in the general formula above. In certain embodiments, the solid silicone resin consists essentially of these units. By "consist essentially of" with reference to the T units in the solid silicone resin when the solid silicone resin comprises the silsesquioxane resin, it is meant that $y \geq 0.8$, alternatively $y \geq 0.85$, alternatively $y \geq 0.9$, alternatively $y \geq 0.95$, alternatively $y \geq 0.96$, alternatively $y \geq 0.97$, alternatively $y \geq 0.98$, alternatively $y \geq 0.99$. Because $w+x+y+z=1$, when $y<1$, the balance is attributable to the presence of at least some molar fraction of M, D and/or Q siloxy units. As such, the silsesquioxane resin may include at least some M, D and/or Q siloxy units based on the subscripts and mole fractions above. In other embodiments, the silsesquioxane resin consists of T siloxy units.

$R^6$ is not limited and is independently selected. For example, $R^6$ may independently be selected from H, OH, or any organic group, e.g. substituted or unsubstituted hydrocarbyl groups, alkoxy groups, amino groups, acetoxy groups, and aminoxy groups. Each $R^6$ in each T siloxy unit may be independently selected in the silsesquioxane resin.

Alternatively, $R^6$ is phenyl, propyl, or methyl. In one embodiment, at least 40 mole %, alternatively at least 50 mole %, alternatively at least 90 mole % of the $R^6$ groups are propyl, in which case the silsesquioxane resin may be referred to as a T-propyl resin. In another embodiment, at least 40 mole %, alternatively 50 mole %, or alternatively 90 mole % of the $R^6$ groups are phenyl, in which case the silsesquioxane resin may be referred to as a T-phenyl resin. In yet another embodiment, $R^6$ may be a mixture of propyl and phenyl. When $R^6$ is a mixture of propyl and phenyl, the amounts of each in the resin may vary, but typically the $R^6$ groups in the silsesquioxane resin may contain 60 to 80 mole percent phenyl and 20 to 40 mole percent propyl. In yet other embodiments, at least 40 mole %, alternatively 50 mole %, or alternatively 90 mole % of the $R^6$ groups are methyl, in which case the silsesquioxane resin may be referred to as a T-methyl resin.

In various embodiments, the silsesquioxane resin contains 2.0% or less, alternatively 0.7% or less, alternatively 0.3% or less (by weight based on the total weight of the silsesquioxane resin), of terminal units represented by the formula $X''SiO_{3/2}$, where $X''$ is defined above and represents hydroxyl or a hydrolyzable group The silsesquioxane resin can also be "capped" wherein residual hydroxy groups are reacted with additional M groups. Alternatively, the silsesquioxane resin may be "uncapped."

The molecular weight of the silsesquioxane resin can depend on many factors, including the siloxane carrier vehicle utilized, whether the solid silicone resin is reactive or non-reactive, etc. In certain embodiments, the silsesquioxane resin has a molecular weight of from greater than 0 to 10,000, alternatively from 500 to 7,500, alternatively from 1,000 to 5,000, Daltons. However, other silsesquioxane resins having higher molecular weights may also be utilized and are contemplated, e.g. silsesquioxane resins having a molecular weight of from 10,000 to 1,000,000 Daltons.

Silsesquioxane resins are known in the art and are typically prepared by hydrolyzing an organosilane having three hydrolyzable groups, such as a halogen or alkoxy, bonded to a silicon atom. Thus, silsesquioxane resins can be obtained by hydrolyzing propyltrimethoxysilane, propyltriethoxysilane, propyltripropoxysilane, or by co-hydrolyzing the aforementioned propylalkoxysilanes with various alkoxysilanes. Examples of these alkoxysilanes include methyltrimethoxysilane, methyltriethoxysilane, methyltriisopropoxysilane, dimethyldimethoxysilane, and phenyltrimethoxysilane. Propyltrichlorosilane can also be hydrolyzed alone, or in the presence of alcohol. In this case, co-hydrolysis can be carried out by adding methyltrichlorosilane, dimethyldichlorosilane, phenyltrichlorosilane, or similar chlorosilanes and methyltrimethoxysilane, methyltriethoxysilane, methyltriisopropoxysilane, or similar methylalkoxysilane. Alcohols suitable for these purposes include methanol, ethanol, n-propyl alcohol, isopropyl alcohol, butanol, methoxy ethanol, ethoxy ethanol, or similar alcohols. Examples of hydrocarbon-type solvents which can also be concurrently used include toluene, xylene, or similar aromatic hydrocarbons; hexane, heptane, isooctane, or similar linear or partially branched saturated hydrocarbons; and cyclohexane, or similar aliphatic hydrocarbons.

Representative, non-limiting examples of commercial silicone resins suitable as the silsesquioxane resin include silicone resins sold under the trademarks DOW CORNING® RSN-0217 Flake Resin, DOW CORNING® RSN-0220 Flake Resin, DOW CORNING® RSN-0233 Flake Resin, DOW CORNING® RSN-0249 Flake Resin, DOW CORNING® RSN-0255 Flake Resin, Xiameter® RSN-6018 Resin, Silres® MK methyl silicone resin.

As used herein, "solid silicone resin" also encompasses silicone-organic resins. Silicone-organic resins include silicone-organic copolymers, which typically include at least one silicone portion and at least one organic portion. The silicone and organic portions of such silicone-organic copolymers may be in block form or randomized.

The silicone portion contains at least one T and/or Q siloxy unit, as defined above. The silicone portion of the silicone-organic resin may be any of the silicone resins described above, including MQ and/or silsesquioxane resins. The organic portion may be any organic polymer, such as those derived by free radical polymerization of one or more ethylenically unsaturated organic monomers. Various types of ethylenically unsaturated and/or vinyl containing organic monomers can be used to prepare the organic portion, including; acrylates, methacrylates, substituted acrylates, substituted methacrylates, vinyl halides, fluorinated acrylates, and fluorinated methacrylates, for example. Some representative compounds include acrylate esters and methacrylate esters such as methyl acrylate, ethyl acrylate, butyl acrylate, 2-ethylhexyl acrylate, methyl methacrylate, decyl acrylate, lauryl acrylate, isodecyl methacrylate, lauryl methacrylate, and butyl methacrylate; substituted acrylates and methacrylates such as hydroxyethyl acrylate, periluorooctyl acrylate, hydroxypropyl acrylate, hydroxypropyl methacrylate, and hydroxyethyl methacrylate; vinyl halides such as vinyl chloride, vinylidene chloride, and chloroprene; vinyl esters such as vinyl acetate and vinyl butyrate; vinyl pyrrolidone; conjugated dienes such as butadiene and isoprene; vinyl aromatic compounds such as styrene and divinyl benzene; vinyl monomers such as ethylene; acrylonitrile and methacrylonitrile; acrylamide, methacrylamide, and N-methylol acrylamide; and vinyl esters of monocarboxylic acids.

The solid silicone resin may also be a combination(s) and/or modification(s) of any of the aforementioned silicone resins.

The selection and molecular weight of the solid silicone resin is not limiting. In certain embodiments, the solid silicone resin has a molecular weight of from greater than 0 to 25,000, alternatively from greater than 0 to 10,000, alternatively from 500 to 7,500, alternatively from 1,000 to 5,000, Daltons. However, solid silicone resins having higher molecular weights may also be utilized and are contemplated, e.g. solid silicone resins having a molecular weight of from 10,000 to 1,000,000 Daltons, or even higher, so long as the solid silicone resin is capable of forming the non-aqueous phase. As understood in the art, selection of substituents may drive or increase molecular weight of the solid silicone resin considerably without impacting its ability to form the non-aqueous phase.

The solid silicone resin may be in the non-aqueous phase of the emulsion in varying amounts contingent on, for example, the selection of the solid silicone resin, the siloxane carrier vehicle utilized, end use applications of the emulsion, etc. Generally, the solid silicone resin may be present in the non-aqueous phase of the emulsion in any amount such that the emulsion can be prepared with the non-aqueous phase, i.e., so long as the siloxane carrier vehicle is capable of dispersing or at least partially solubilizing the solid silicone resin in the emulsion, which amount can be readily determined by one of skill in the art. In certain embodiments, the non-aqueous phase of the emulsion comprises the solid silicone resin in an amount of from >0 to <100, alternatively from >0 to <90, alternatively from >0 to <80, alternatively from >0 to <70, alternatively from >0 to <60, alternatively from >0 to <50, alternatively from >0 to <40, alternatively from >0 to <30, alternatively from >5 to <25, weight percent based on the total weight of the non-aqueous phase of the emulsion. For example, the non-aqueous phase of the emulsion may comprise the solid silicone resin in an amount of from 5 to 15, alternatively from 6 to 14, alternatively from 7 to 13, alternatively from 8 to 12, weight percent based on the total weight of the non-aqueous phase of the emulsion. Alternatively, the non-aqueous phase of the emulsion may comprise the solid silicone resin in an amount of from 15 to 25, alternatively from 16 to 24, alternatively from 17 to 23, alternatively from 18 to 22, weight percent based on the total weight of the non-aqueous phase of the emulsion.

The non-aqueous phase of the emulsion further comprises a siloxane carrier vehicle. The siloxane carrier vehicle is different from the solid silicone resin. The siloxane carrier vehicle carries the solid silicone resin. By "carry," it is meant that the solid silicone resin is dispersed in, alternatively partially solubilized in, alternatively solubilized in, the siloxane carrier vehicle. The siloxane carrier vehicle includes at least one silicon-bonded functional group. The at least one silicon-bonded functional group is not limited and may be a non-reactive group. For example, the at least one silicon-bonded functional group may be silicon-bonded methyl, which typically does not react (e.g. hydrolyze or condense) even when applying a curing condition to the emulsion. In other embodiments, however, the at least one silicon-bonded functional group may be reactive such that a cured product of the emulsion has an increased cross-link density and/or hardness. In certain embodiments, the at least one silicon-bonded functional group is selected from H, OH, alkoxy groups, alkenyl groups, aminoxy groups and acetoxy groups.

The siloxane carrier vehicle is typically a flowable liquid at room temperature, i.e., 25° C. Specifically, the siloxane carrier vehicle is typically flowable even when combined with the solid silicone resin to give the non-aqueous phase of the emulsion, and has a lesser viscosity than the solid silicone resin. In certain embodiments, the siloxane carrier vehicle has a viscosity of from greater than 0 to 1,000, alternatively from 10 to 900, alternatively from 50 to 750, alternatively from 75 to 500, alternatively from 100 to 300, centistokes at 25° C.

In certain embodiments, the siloxane carrier vehicle has the general formula $(R^7R^8R^9SiO_{1/2})_{w'}(R^{10}R^{11}SiO_{2/2})_{x'}(R^{12}SiO_{3/2})_{y'}(SiO_{4/2})_{z'}$, where $R^7$-$R^{12}$ are independently selected from H, OH, or any organic group, e.g. substituted or unsubstituted hydrocarbyl groups, alkoxy groups, amino groups, acetoxy groups, and aminoxy groups, and wherein w', x', y' and z' are independently from $\geq 0$ to $\leq 1$, with the proviso that w'+x'+y'+z'=1. In specific embodiments, at least one $R^7$-$R^{12}$ is the silicon-bonded functional group selected from H, OH, alkoxy groups, alkenyl groups, aminoxy groups and acetoxy groups, The amount of each siloxy unit present in the siloxane carrier vehicle is expressed as a mole fraction (via subscripts w', x', y' and z') of the total number of moles of all M, D, T, and Q siloxy units present in the siloxane carrier vehicle. Any such formula used herein to represent the siloxane carrier vehicle does not indicate structural ordering of the various siloxy units therein. Rather, such formulae are meant to provide a convenient notation to describe the relative amounts of the siloxy units in the siloxane carrier vehicle, as per the mole fractions described above via the subscripts w', x', y' and z'. The mole fractions of the various siloxy units in the siloxane carrier vehicle, as well as the silanol content, may be readily determined by $^{29}Si$ NMR techniques.

In specific embodiments, the siloxane carrier vehicle comprises a resinous silicone. In these embodiments, relative to the general formula above, subscripts y' and z' are not simultaneously 0, as resinous silicones include at least some T and/or Q siloxy units. In these embodiments, the siloxane carrier vehicle is not linear.

Any of the examples above relative to the solid silicone resin are also applicable to the siloxane carrier vehicle, with the understanding that the viscosity of the siloxane carrier vehicle is capable of dispersing the solid silicone resin (and is a lesser viscosity than that of the solid silicone resin).

In certain embodiments, the silicon-bonded functional group is an alkoxy group, e.g. a $C_1$-$C_{20}$ alkoxy group, alternatively a $C_1$-$C_{10}$ alkoxy group, alternatively a $C_1$-$C_4$ alkoxy group, alternatively a methoxy group. Each silicon-bonded alkoxy group may be independently selected. Such silicon-bonded alkoxy groups may condense to give siloxane bonds if a curing condition is applied to the emulsion.

In certain embodiments, the siloxane carrier vehicle may comprise a silsesquioxane resin. The silsesquioxane resin may alternatively be referred to as a T resin, and comprises T siloxy units, i.e., ($R^{12}SiO_{3/2}$) units, where $R^{12}$ is defined above. These siloxy units are indicated by subscript y' in the general formula above. In certain embodiments, the siloxane carrier vehicle consists essentially of these units. By "consist essentially of" with reference to the T units in the siloxane carrier vehicle when the siloxane carrier vehicle comprises the silsesquioxane resin, it is meant that y'≥0.8, alternatively y'≥0.85, alternatively y'≥0.9, alternatively y'≥0.95. Because w+x+y+z=1, when y<1, the balance is attributable to the presence of at least some molar fraction of M, D and/or Q siloxy units. As such, the silsesquioxane resin may include at least some M, D and/or Q siloxy units based on the subscripts and mole fractions above.

In some embodiments, the siloxane carrier vehicle comprises at least some D siloxy units, indicated above by subscript x', which as compared to T and Q siloxy units may aid in reducing viscosity of the siloxane carrier vehicle.

For example, in certain embodiments, the silsesquioxane resin further comprises D siloxy units, i.e., siloxy units of formula ($R^{10}R^{11}SiO_{2/2}$), where $R^{10}$ and $R^{11}$ are defined above. In these embodiments, the silsesquioxane resin has the formula ($R^{10}R^{11}SiO_{2/2}$)$_{x'}$($R^{12}SiO_{3/2}$)$_{y'}$, where x', y', $R^{10}$, $R^{11}$ and $R^{12}$ are defined above, with at least one of $R^{10}$, $R^{11}$ and $R^{12}$ being the silicon-bonded functional group. In specific embodiments, $R^{10}$ is alkyl, e.g. methyl, $R^{11}$ is alkoxy, e.g. methoxy, and $R^{12}$ is alkyl, e.g. methyl. In this embodiment, the silsesquioxane resin may be referred to as a methylmethoxysiloxane methylsilsesquioxane resin. A methylmethoxysiloxane methylsilsesquioxane resin is commercially available as DOW CORNING® US-CF 2403 Resin from Dow Corning Corporation of Midland, Mich., U.S.A. Depending on the molar fractions of T and D siloxy units, such a resin may be referred to as a silsesquioxane resin and/or a DT resin.

Another example of a suitable silsesquioxane resin including D siloxy units is a dimethylsiloxane with methyl silsesquioxane and n-octyl silsesquioxane, methoxy-terminated. Such silsesquioxane resins are commercially available as DOW CORNING® 2405 Resin from Dow Corning Corporation of Midland, Mich., U.S.A.

Alternatively, the siloxane carrier vehicle may comprise D siloxy units of formula ($R^{10}R^{11}SiO_{2/2}$), T units of formula ($R^{12}SiO_{3/2}$), and Q units of formula ($SiO_{4/2}$) i.e., a DTQ resin, where $R^{10}$, $R^{11}$ and $R^{12}$ are defined above, with at least one of $R^{10}$, $R^{11}$ and $R^{12}$ being the silicon-bonded functional group.

DT resins are known in the art and are commercially available, for example, methoxy functional DT resins include DOW CORNING® 3074, DOW CORNING® 3037 and DOW CORNING® Z-6289 resins. Other suitable resins include DT resins containing methyl and phenyl groups.

The siloxane carrier vehicle may be in the non-aqueous phase of the emulsion in varying amounts contingent on, for example, the selection of the solid silicone resin, the siloxane carrier vehicle utilized, end use applications of the emulsion, etc. Generally, the siloxane carrier vehicle may be present in the non-aqueous phase of the emulsion in any amount such that the emulsion can be prepared with the non-aqueous phase, i.e., so long as the siloxane carrier vehicle is capable of dispersing or at least partially solubilizing the solid silicone resin in the emulsion, which amount can be readily determined by one of skill in the art. In certain embodiments, the non-aqueous phase of the emulsion comprises the siloxane carrier vehicle in an amount of from >0 to <100, alternatively from >10 to <100, alternatively from >20 to <100, alternatively from >30 to <100, alternatively from >40 to <100, alternatively from >50 to <100, alternatively from >60 to <100, alternatively from >70 to <100, alternatively from >75 to <95, weight percent based on the total weight of the non-aqueous phase of the emulsion. For example, the non-aqueous phase of the emulsion may comprise the siloxane carrier vehicle in an amount of from 85 to 95, alternatively from 86 to 94, alternatively from 87 to 93, alternatively from 88 to 92, weight percent based on the total weight of the non-aqueous phase of the emulsion. Alternatively, the non-aqueous phase of the emulsion may comprise the siloxane carrier vehicle in an amount of from 75 to 85, alternatively from 76 to 84, alternatively from 77 to 83, alternatively from 78 to 82, weight percent based on the total weight of the non-aqueous phase of the emulsion.

In certain embodiments, the non-aqueous phase consists essentially of, alternatively consists of, the siloxane resin, the siloxane carrier vehicle, and optionally a surfactant, as described below.

As introduced above, the emulsion further comprises an aqueous phase, which is typically the continuous phase of the emulsion, but may be the discontinuous phase. The aqueous phase comprises water. The water may be from any source and may optionally be purified, e.g. through filtration, distillation, reverse-osmosis techniques, etc.

The aqueous phase comprises water, alternatively consists essentially of water, alternatively consists of water. Consisting essentially of, as used herein with respect to the aqueous phase consisting essentially of water, means that the aqueous phase comprises water, and optionally a surfactant and any optional components described below. In particular, the aqueous phase comprises water in an amount of from at least 50 to 100, alternatively from at least 60 to 100, alternatively from at least 70 to 100, alternatively from at least 80 to 100, alternatively from at least 90 to 100, alternatively from at least 95 to 100, alternatively from at least 96 to 100, alternatively from at least 97 to 100, alternatively from at least 98 to 100, alternatively from at least 99 to 100, alternatively 100, weight percent based on the total weight of the aqueous phase.

The emulsion further comprises a surfactant. The surfactant may alternatively be referred to as an emulsifier and generally serves to emulsify the non-aqueous phase in the aqueous phase of the emulsion. The surfactant may be any surfactant suitable for preparing the emulsion with the non-aqueous phase and the aqueous phase.

For example, the surfactant may comprise one or more anionic, cationic, nonionic, and/or amphoteric surfactants, organomodified silicones such as dimethicone copolyol, oxyethylenated and/or oxypropylenated ethers of glycerol, oxyethylenated and/or oxypropylenated ethers of fatty alcohols such as ceteareth-30, C12-15 pareth-7, fatty acid esters of polyethylene glycol such as PEG-50 stearate, PEG-40 monostearate, saccharide esters and ethers such as sucrose stearate, sucrose cocoate and sorbitan stearate, and mixtures thereof, phosphoric esters and salts thereof such as DEA oleth-10 phosphate, sulphosuccinates such as disodium PEG-5 citrate lauryl sulphosuccinate and disodium ricinoleamido MEA sulphosuccinate, alkyl ether sulphates such as sodium lauryl ether sulphate, isethionates, betaine derivatives, and mixtures thereof.

In certain embodiments, the surfactant comprises the anionic surfactant. Anionic surfactants include, for example, carboxylates (sodium 2-(2-hydroxyalkyloxy)acetate)), amino acid derivatives (N-acylglutamates, N-acylglycinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate and triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid, and mixtures thereof.

In these or other embodiments, the surfactant comprises the cationic surfactant. Cationic surfactants include, for example, various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such asundecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, and hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmitylhydroxyethylammonium methosulfate, amide derivatives of amino alcohols such as beta-hydroxylethylstearylamide, amine salts of long chain fatty acids, and mixtures thereof.

In these or other embodiments, the surfactant comprises the nonionic surfactant. Nonionic surfactants include, for example, polyoxyethylene alkyl ethers (such as, lauryl, cetyl, stearyl or octyl), polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, polyoxyalkylene-substituted silicones (rake or ABn types), silicone alkanolamides, silicone esters, silicone glycosides, dimethicone copolyols, fatty acid esters of polyols, for instance sorbitol and glyceryl mono-, di-, tri- and sesquioleates and stearates, glyceryl and polyethylene glycol laurates; fatty acid esters of polyethylene glycol (such as polyethylene glycol monostearates and monolaurates), polyoxyethylenated fatty acid esters (such as stearates and oleates) of sorbitol, and mixtures thereof.

In these or other embodiments, the surfactant comprises the amophoteric surfactant. Amphoteric surfactants, include, for example, amino acid surfactants, betaine acid surfactants, trimethylnonyl polyethylene glycol ethers and polyethylene glycol ether alcohols containing linear alkyl groups having from 11 to 15 carbon atoms, such as 2,6,8-trimethyl-4-nonyloxypolyethylene oxyethanol (6 EO) (sold as Tergitol®TMN-6 by OSi Specialties, A Witco Company, Endicott, N.Y.), 2,6,8-trimethyl-4-nonyloxypolyethylene oxyethanol (10 EO) (sold as Tergitol®TMN-10 by OSi Specialties, A Witco Company, Endicott, N.Y.), alkyleneoxypolyethylene oxyethanol ($C_{11-15}$ secondary alkyl, 9 EO) (sold as Tergitol®15-S-9 by OSi Specialties, A Witco Company, Endicott, N.Y.), alkylene-oxypolyethylene oxyethanol ($C_{11-15}$ secondary alkyl, 15 EO) (sold as Tergitol®15-S-15 by OSi Specialties, A Witco Company, Endicott, N.Y.), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines (available from Armak Company, Chicago, Ill. under the tradenames Ethoquad, Ethomeen, or Argued), polyoxyalkylene glycol modified polysiloxanes, N-alkylamidobetaines and derivatives thereof, proteins and derivatives thereof, glycine derivatives, sultaines, alkyl polyaminocarboxylates and alkylamphoacetates, and mixtures thereof. These surfactants may also be obtained from other suppliers under different tradenames.

The surfactant may be included in the emulsion at concentrations effective for emulsifying the non-aqueous phase in the aqueous phase (or vice versa). Such concentrations range from greater than 0 to 10, alternatively from 0.3 to about 5.0, weight percent based on the total weight of the emulsion. The surfactant, or combination of surfactants, may be present in the aqueous phase of the emulsion, the non-aqueous phase of the emulsion, an interface of the aqueous and non-aqueous phases, or combinations thereof.

In certain embodiments, the emulsion further comprises a catalyst, e.g. a condensation catalyst. In some embodiments the condensation catalyst may be selected from any catalyst known in the art to effect condensation cure of condensation-curable compositions. The catalyst may be included in the emulsion just prior to any end use application thereof so as to prevent premature curing of components in the emulsion, e.g. as a two component (2k) system.

Condensation catalyst can be any chemical entity or molecule that may be used to promote a condensation reaction of silicon bonded hydroxy (silanol) groups to form Si—O—Si linkages (and by-product water molecules) to give a condensation-cured product.

Examples of suitable condensation catalysts include nitrogen-containing bases (e.g., nitrogen-containing superbases) described herein and complexes of lead, tin, titanium, zinc, and iron, such as various tin or titanium catalysts. Other examples include other basic compounds, such as trimethylbenzylammonium hydroxide, tetramethylammonium hydroxide and metal-containing compounds such as tetraethyl titanate, tetrapropyl titanate (e.g. tetraisopropyl orthotitanate), tetrabutyl titanate, titanium tetraisooctylate, titanium isopropylate tristearoylate, titanium triisopropylate stearoylate, titanium diisopropylate distearoylate, zirconium tetrapropylate, zirconium tetraisopropylate, zirconium tetrabutylate, titanium acetylacetonate, aluminum triisobutoxide, aluminum triisopropoxide, zirconium tetra(acetylacetonato), zirconium tetrabutylate, cobalt octylate, cobalt acetylacetonato, iron acetylacetonato, tin acetylacetonato, dibutyltin octylate, dibutyltin laurate, zinc octylate, zinc bezoate, zinc p-tert-butylbenzoate, zinc laurate, zinc stearate, aluminum phosphate, and aluminum triisopropoxide; organic aluminum chelates such as aluminum trisacetylacetonate and aluminum bisethylacetoacetate monoacetylacetonate; and organic titanium chelates such as diisopropoxybis(ethylacetoacetate)titanium, and diisopropoxybis(ethylacetoacetate) titanium.

Additional examples of condensation catalysts include, but are not limited to aluminum alkoxides, antimony alkoxides, barium alkoxides, boron alkoxides, calcium alkoxides, cerium alkoxides, erbium alkoxides, gallium alkoxides, silicon alkoxides, germanium alkoxides, hafnium alkoxides, indium alkoxides, iron alkoxides, lanthanum alkoxides, magnesium alkoxides, neodymium alkoxides, samarium alkoxides, strontium alkoxides, tantalum alkoxides, titanium alkoxides, tin alkoxides, vanadium alkoxide oxides, yttrium alkoxides, zinc alkoxides, zirconium alkoxides, titanium or zirconium compounds, especially titanium and zirconium alkoxides, and chelates (such as alkyl acetylacetonate, ethanolamine, ammonium salts of lactic acid) and oligocondensates and polycondensates of the above alkoxides, dialkyltin diacetate, tin(II) octoate, dialkyltin diacylate, dialkyltin oxide and double metal alkoxides. Double metal alkoxides are alkoxides containing two different metals in a particular ratio. Conventional condensation catalyst, including acids (e.g. sulfonic acids) and bases (e.g. ammonia or sodium hydroxide) may also be utilized.

The amount of catalyst in the emulsion, if any, may vary and is not limiting. In some embodiments, the amount of catalyst is a catalytically effective amount for promoting (enhancing) a hydrolysis and/or condensation reaction or curing of the curable components of the emulsion, e.g. at least the siloxane carrier vehicle. For example, the emulsion typically comprises the catalyst when the silicon-bonded functional group of the siloxane carrier vehicle is reactive.

In some embodiments, the amount of catalyst present in the emulsion is described in parts per million (ppm). The amount of catalyst included in the emulsion, if any, may range from greater than 0 to 1,000 ppm, alternatively from 1 to 500 ppm, alternatively from 10 to 100 ppm, alternatively from 10 to 50 ppm, alternatively 5 to 30 ppm, alternatively from 5 to 25 ppm, by weight of the emulsion.

The emulsion may further comprise one or more various optional additives, such as coupling agents, antistatic agents, ultraviolet (UV) absorbers, plasticizers, leveling agents, preservatives, surface active materials (surfactants or detergents or emulsifiers), foam boosters, deposition agents, thickeners, water phase stabilizing agents, fillers, suspending agents, biocides, freeze/thaw additives, anti-freeze agents, viscosity modifiers, foam control agents, dyestuff (e.g. pigments), binders and combinations thereof.

Alternatively or in addition to the above, the emulsion may further comprise various additive compounds for improving properties of the film formed therefrom. Examples of additive compounds are silanes, such as tetrakis(dimethylamine)silane, tetraethylorthosilicate, glycidoxypropyltrimethoxysilane, triethylsilane, isobutyltrimethoxysilane; and siloxanes, such as heptamethyltrisiloxane, tetramethyldisloxane etc.

In certain embodiments, the emulsion further comprises a dyestuff. The dyestuff may be selected from pulverulent dyestuffs (such as pigments and nacres) and water-soluble dyestuffs. The term "pigments" means white or colored, mineral or organic particles of any form, which are insoluble in the physiological medium, and which are intended to color the emulsion. The term "nacres" means iridescent particles of any form, produced especially by certain molluscs in their shell, or else synthesized.

The pigments may be white or colored, and mineral and/or organic. The mineral pigments include titanium dioxide, optionally surface-treated, zirconium oxide or cerium oxide, zinc oxide, iron oxide (black, yellow or red), chromium oxide, manganese violet, ultramarine blue, chromium hydrate, ferric blue, and metal powders, for instance aluminum powder or copper powder. The organic pigments include carbon black, pigments of D & C type, and lakes based on cochineal carmine or on barium, strontium, calcium or aluminum.

The pigment may also have an effect, such as particles comprising a natural or synthetic, organic or mineral substrate, for example glass, acrylic resins, polyester, polyurethane, polyethylene terephthalate, ceramics or aluminas, the substrate being uncoated or coated with metallic substances, for instance aluminum, gold, silver, platinum, copper or bronze, or with metal oxides, for instance titanium dioxide, iron oxide or chromium oxide, and combinations thereof.

The nacres may be chosen from white nacreous pigments such as mica coated with titanium or with bismuth oxychloride, colored nacreous pigments such as titanium mica coated with iron oxides, titanium mica coated with ferric blue or with chromium oxide, titanium mica coated with an organic pigment of the abovementioned type, and also nacreous pigments based on bismuth oxychloride. Interference pigments, such as liquid-crystal or multilayer interference pigments, may alternatively be used.

If present in the emulsion, the pigment may be included in any suitable amount contingent on desired end use properties of the emulsion. For example, in certain embodiments, the emulsion comprises the pigment or dyestuff in an amount of from 1 to 50, alternatively from 5 to 40, alternatively from 10 to 30, weight percent based on the total weight of the emulsion.

The filler suitable for use in the emulsion described herein may be mineral or organic, of any form, platelet-shaped, spherical or oblong, irrespective of the crystallographic form (for example lamellar, cubic, hexagonal, orthorhombic, etc.). Examples include talc, mica, silica, kaolin, polyamide, poly-β-alanine powder and polyethylene powder, tetrafluoroethylene polymer powders, lauroyllysine, starch, boron nitride, hollow polymer microspheres, acrylic acid copolymers, silicone resin microbeads, elastomeric polyorganosiloxane particles, precipitated calcium carbonate, magnesium carbonate, magnesium hydrogen carbonate, hydroxyapatite, hollow silica microspheres, glass and ceramic microcapsules, metal soaps such as zinc stearate, magnesium stearate, lithium stearate, zinc laurate, and magnesium myristate, and poly(methyl methacrylate) powders. Alternatively, the filler may be a polyurethane powder. Combinations of different fillers may be utilized together in the emulsion.

If present in the emulsion, the filler may be included in any suitable amount contingent on desired end use properties of the emulsion. For example, in certain embodiments, the emulsion comprises the filler in an amount of from 0 to 50, alternatively from 5 to 40, alternatively from 10 to 30, alternatively weight percent based on the total weight of the emulsion.

The emulsion is substantially free of organic solvents. "Substantially free," as used herein with reference to the emulsion being substantially free from organic solvents, means that the emulsion may comprise organic solvents in an amount of from 0 to less than 2, alternatively from 0 to less than 1, alternatively from 0 to less than 0.5, alternatively from 0 to less than 0.1, alternatively from 0 to less than 0.05, alternatively 0, weight percent based on the total weight of the emulsion. Typically, conventional emulsions include organic solvents or oils in non-aqueous phases, although the non-aqueous phase, and the emulsion itself, are substantially free of such organic solvents.

Representative non-limiting examples of organic solvents include toluene, xylene, and similar aromatic hydrocarbons; hexane, heptane, isooctane, and similar linear or partially branched saturated hydrocarbons; cyclohexane and similar aliphatic hydrocarbons; low molecular weight alcohols such as methanol, ethanol, propanol, isopropanol and the like; low molecular weight ethers such as di(propyleneglycol) mono methyl ether, di(ethyleneglycol) butyl ether, di(ethyleneglycol) methyl ether, di(propyleneglycol) butyl ether, di(propyleneglycol) methyl ether acetate, di(propyleneglycol) propyl ether, ethylene glycol phenyl ether, propylene glycol butyl ether, 1-methoxy-2-propanol, 1-methoxy-2-propyl acetate, propylene glycol propyl ether, 1-phenoxy-2-propanol, tri(propyleneglycol) methyl ether and tri(propyleneglycol) butyl ether, and other like glycols.

The discontinuous phase generally forms particles in the continuous phase of the emulsion. The particles are liquid and may alternatively be referred to as droplets. The size of the particles is typically contingent on, for example, the selection of components therein and their amounts.

In certain embodiments, the particles have an average particle size of from 0.01 to 4.0, alternatively from 0.5 to 3.5, alternatively from 1.0 to 3.0, alternatively from 1.5 to 2.5, alternatively from 1.75 to 2.25, micrometers, as measured via a dynamic light scattering technique. As understood in the art, the average particle size may vary dependent on the technique utilized to measure the average particle size, and techniques other than dynamic light scattering may be utilized herein.

The present invention also provides a method of preparing the emulsion. The method comprises combining the solid silicone resin and the siloxane carrier vehicle to give a non-aqueous composition. The method further comprises combining the non-aqueous composition, water, and the surfactant to give a mixture. Finally, the method comprises shearing the mixture, thereby preparing the emulsion.

In certain embodiments, the non-aqueous composition and the surfactant are first combined to give an initial mixture, and water is combined with the initial mixture to prepare the emulsion. Any other optional components, e.g. dyestuff and/or fillers, may also be combined with or included in the initial mixture prior to combining the initial mixture with water. In specific embodiments, the initial mixture may be combined with water incrementally, optionally under shear. However, the components may be combined in any order or manner, and with any order of addition, including via use of a master batch. For example, water may be disposed in the initial mixture, or the initial mixture may be disposed in water, and so on.

Shearing or mixing can be accomplished by any method known in the art to effect mixing of high viscosity materials. The mixing may occur either as a batch, semi-continuous, or continuous process. Mixing may occur, for example using, batch mixing equipment with medium/low shear including change-can mixers, double-planetary mixers, conical-screw mixers, ribbon blenders, double-arm, and sigma-blade mixers; batch equipment with high-shear and high-speed dispersers including those made by Charles Ross & Sons (NY) and Hockmeyer Equipment Corp. (NJ); batch mixing equipment such as those sold under the tradename Speedmixer®; and batch equipment with high shear actions including Banbury-type (CW Brabender Instruments Inc., NJ) and Henschel type (Henschel mixers America, TX). Illustrative examples of continuous mixers/compounders include extruders, such as single-screw, twin-screw, and multi-screw extruders, co-rotating extruders such as those manufactured by Krupp Werner & Pfleiderer Corp (Ramsey, N.J.) and Leistritz (N.J.); twin-screw counter-rotating extruders, two-stage extruders, twin-rotor continuous mixers, dynamic and static mixers, and combinations of such equipment.

Combining the components of the emulsion, or combining the non-aqueous composition and water to prepare the emulsion, may occur in a single step or multiple step process. Thus, the components may be combined in total, and subsequently mixed via any of the techniques described above. Alternatively, only a portion(s) of the components may first be combined and mixed, followed by combining additional quantities of any component(s) and further mixing. Typically, the water is added in incremental portions, wherein sufficient incremental portions of water are added to form an emulsion. Further still, the emulsion itself may be first prepared and subsequently combined with other components or another emulsion, e.g. the emulsion itself may be a component in another composition.

The present invention also provides a method of preparing a film with the emulsion and the film formed thereby. The method of preparing the film comprises applying the emulsion on a substrate. The method further comprises forming the film on the substrate from the emulsion.

The method by which the emulsion is applied on the substrate may vary. For example, in certain embodiments, the step of applying the emulsion on the substrate uses a wet coating application method. Specific examples of wet coating application methods suitable for the method include dip coating, spin coating, flow coating, spray coating, roll coating, gravure coating, sputtering, slot coating, inkjet printing, and combinations thereof.

The substrate is not limited and may be any material, and may be continuous or discontinuous and may have any size, shape, dimension, and surface roughness. In certain embodiments, the substrate comprises a plastic, which maybe a thermosetting and/or thermoplastic. However, the substrate may alternatively be glass, metal, paper, wood, a silicone, or other materials, or a combination thereof.

Specific examples of suitable plastic substrates include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, cellophane, etc.; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

Typically, applying the emulsion on the substrate results in a wet film on the substrate, and forming the film on the substrate comprises drying the wet film on the substrate to form the film. For example, drying the wet film may comprise (i) evaporating water from the wet film; (ii) exposing the wet film to an elevated temperature to drive water therefrom; or (iii) both (i) and (ii). Forming the film from the wet film may also result in a chemical reaction beyond mere physical drying of the wet film. For example, the siloxane carrier vehicle, and optionally the solid silicone resin, may react (e.g. cure) such that the film is the reaction product of the emulsion.

The film may be separable from the substrate (e.g. peelable) or may be physically and/or chemically bonded to the substrate. The substrate may have an integrated hot plate or an integrated or stand-alone furnace for drying/curing the deposit. The substrate may optionally have a continuous or non-continuous shape, size, dimension, surface roughness, and other characteristics. In certain embodiments, the substrate has a softening point temperature at the elevated temperature. However, the emulsion and method are not so limited.

Typically, forming the film comprises exposing the wet film to an elevated temperature for a period of time. The elevated temperature is typically from 50 to 250, alternatively from 100 to 200, alternatively from 110 to 190, alternatively from 120 to 180, alternatively from 130 to 170, alternatively from 140 to 160, alternatively from 145 to 155, ° C. The period of time is typically sufficient to effect drying and/or curing the emulsion, or at least curing (e.g. crosslinking) the non-aqueous phase thereof. In certain embodiments, the period of time is from greater than 0 to 10, alternatively from greater than 0 to 5, alternatively from greater than 0 to 2, hours. The period of time may be broken down into dry/cure iterations, e.g. a first-cure and a post-cure, with the first-cure being, for example, one hour and the post-cure being, for example, one hour. The elevated temperature may be independently selected in such iterations, and may be the same in each iteration. Alternatively, the film may be formed by merely exposing the wet film to ambient conditions, i.e., drying in the absence of any elevated temperature.

Depending on a thickness and other dimensions of the film, the film could also be formed via an iterative process. For example, a first deposit may be formed and optionally subjected to a first elevated temperature for a first period of time to give a partially dried and/or cured deposit. Then, a second deposit may be disposed on the first deposit or the partially dried and/or cured deposit and optionally subjected to a second elevated temperature for a second period of time to give a second partially dried/cured deposit. This process may be repeated, for example, from 1 to 50 times to build the film as desired. Each elevated temperature and period of time may be independently selected and may be the same as or different from one another. The iterative process may be wet-on-wet. Alternatively, the iterative process may be wet-on-dry, depending on a dry/cure state of the partially dried and/or cured deposit.

The film may have a thickness which varies depending upon its end use application. Typically, the film has a thickness of from greater than 0 to 4,000 micrometers ($\mu m$), alternatively from greater than 0 to 3,000 micrometers ($\mu m$), alternatively from greater than 0 to 2,000 micrometers ($\mu m$), alternatively from greater than 0 to 1,000 micrometers ($\mu m$), alternatively from greater than 0 to 500 micrometers ($\mu m$), alternatively from greater than 0 to 250 micrometers (pm), alternatively from greater than 0 to 100 micrometers ($\mu m$), alternatively from 1 to 50 micrometers ($\mu m$), alternatively from 20 to 30 micrometers ($\mu m$). However, other thicknesses are contemplated, e.g. from 0.1 to 200 $\mu m$. For example, the thickness of the film may be from 0.2 to 175 $\mu m$; alternatively from 0.5 to 150 $\mu m$; alternatively from 0.75 to 100 $\mu m$; alternatively from 1 to 75 $\mu m$; alternatively from 2 to 60 pm; alternatively from 3 to 50 $\mu m$; alternatively from 4 to 40 $\mu m$; alternatively any one of 1, 2, 3, 4, 5, 6, 7, 8, 9, 10, 15, 20, 25, 30, 35, 40, 45, 50, 60, 70, 75, 80, 90, 100, 150, 175, and 200 $\mu m$.

Independent of the method by which the film is formed, once the film is formed on the substrate from the emulsion, the film may further undergo heating, humidification, catalytic post treatment, photoirradiation, electron beam irradiation, etc.

If desired, the film may be subjected to further processing depending upon its end use application. For example, the film may be subjected to oxide deposition (e.g. $SiO_2$ deposition), resist deposition and patterning, etching, chemical or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The present invention also provides a composition comprising the emulsion. The composition comprises the emulsion and an organic binder. The emulsion can be formed in situ in the composition, or the emulsion can be first prepared and then combined with the organic binder, along with any other optional components, to give the composition. Typically, the composition is formed by combining the emulsion and the organic binder, along with any optional components. The emulsion typically is present in the composition, i.e., forming the composition with the emulsion doesn't destroy the emulsion.

The organic binder is not limited and is generally selected based on end use applications of the composition. While exemplary examples are set forth below, any organic binder may be utilized in the composition. The organic binder may be reactive or non-reactive, and may be a thermoplastic and/or thermoset. Typically, the organic binder is an organic polymer and/or resin.

In certain embodiments, the organic binder comprises a natural latex. In these or other embodiments, the organic binder comprises a synthetic latex. The organic binder may also be a combination of natural and synthetic latex. For example, the organic binder is typically a natural and/or synthetic latex when the composition is utilized to prepare films or paints. Natural and synthetic latexes are known in the art. For example, depending on a selection of the organic binder, the composition may be utilized as a paint, e.g. a heat resistant paint, which may be solventless. The paint may be utilized in insulation applications, anti-fouling applications, architectural applications, commercial/industrial or residential applications, protective applications, leather applications, textile applications, etc.

Specific examples of organic binders include, but are not limited to, polyolefins, acrylic polymers, polyvinyl acetate, polyvinyl chloride, styrenes (e.g. styrene-butadiene rubber), acrylonitrile-butadienes, epoxy resins, phenolics, polyesters, polyvinylbutyral, phenoxys, polyureas, cellulosic resins, polyurethanes, polyamides, polyethers, alkyds, silicones, acrylonitriles, etc. The organic binder may comprise a combination of such organic binders, or copolymers or terpolymers including one or more such organic binders.

The content of the organic binder in the composition may vary on a number of factors, such as its selection, the type and amount of the emulsion present in the composition, end use applications of the composition, etc. Increased loadings of the organic binder generally result in films having greater hardness and other increased physical properties. In certain embodiments, the composition comprises the binder in an amount of from greater than 0 to less than 100, alternatively from greater than 0 to 50, alternatively from 0.1 to 40, alternatively from 5 to 15, wt. % based on the total weight of the composition.

The organic binder may be dispersed or disposed in a carrier vehicle. The carrier vehicle may be any suitable carrier vehicle, which typically solubilizes the organic binder. The carrier vehicle is typically a function of the organic binder utilized. The carrier vehicle may be water such that the composition as a whole is water-based, or may be a solvent other than water, e.g. an organic solvent. In certain embodiments, like the emulsion, the composition is substantially free from water. Substantially free from water is defined with respect to the emulsion.

In some embodiments the composition further comprises one or more optional components. The composition may comprise any of the optional components described above with respect to the emulsion. These optional components may be included in the composition from being present in the emulsion, may be incorporated into the composition independent from the emulsion, or both. Specific examples of optional components include, but are not limited to, colorants, coalescing aids, surfactants, thickeners, defoamers, compatibilizers, UV stabilizers, antioxidants, biocides, flame retardants, etc., Some of these optional components may be present in the emulsion, as described above, and thus included in the composition, or one or more of these optional components may be incorporated when forming the composition. Any of the optional components described above relative to the emulsion may also be present in the composition, either through introduction from the emulsion or from inclusion of an additional amount of the particular component. By way of example, the composition may comprise a catalyst, which may be the same as or different from any catalyst that may be present in the emulsion.

In certain embodiments, the composition further comprises one or more colorants, such as pigments, dyes, and the like. Such colorants can be organic or inorganic, synthetic or natural. Examples of colorants are set forth above regarding the emulsion. The emulsion and the composition itself may include different colorants which are independently selected. Additional examples of suitable colorants include cadmium yellow, cadmium red, cadmium green, cadmium orange, carbon black (including vine black, lamp black), ivory black (bone char), chrome yellow, chrome green, cobalt violet, cobalt blue, cerulean blue, aureolin (cobalt yellow), Azurite, Han purple, Han blue, Egyptian blue, Malachite, Paris green, Phthalocyanine Blue BN, Phthalocyanine Green G, verdigris, viridian, sanguine, caput mortuum, oxide red, red ochre, Venetian red, Prussian blue, yellow ochre, raw sienna, burnt sienna, raw umber, burnt umber, Cremnitz white, Naples yellow, vermilion titanium yellow, titanium beige, titanium white ($TiO_2$), titanium black, ultramarine, ultramarine green shade, zinc white, zinc ferrite, alizarin (synthesized or natural), alizarin crimson (synthesized or natural), gamboge, cochineal red, rose madder, indigo, Indian yellow, Tyrian purple, quinacridone, magenta, phthalo green, phthalo blue, pigment red 170, or any combinations thereof.

In particular embodiments, the composition further comprises a coalescing aid. Suitable coalescing aids include any compound that decreases the minimum film-formation temperature of the organic binder, when the organic binder indeed forms a film, and/or increases the rate of solid film formation from the organic binder when any carrier vehicle or water is removed from the composition. Examples of suitable coalescing aids include glycol ethers, 2,2,4-trimethyl-1,3-pentanediol isobutyrate, and combinations thereof In certain embodiments, the composition comprises a surfactant. The surfactant may be the same as or different from any surfactant utilized in the emulsion, examples of which are set forth above.

Thickeners (or rheology modifiers) may also be included in the composition to achieve desired viscosity and flow properties. Depending on their selection, as the selection of the organic binder, the thickeners may function by, for example, forming multiple hydrogen bonds with the organic binder, thereby causing chain entanglement, looping and/or swelling which results in volume restriction. In certain embodiments, thickeners such as cellulose derivatives including hydroxyethyl cellulose, methyl cellulose and carboxymethyl cellulose, may be utilized.

In some embodiments, the composition includes a defoamer. The defoamer may be any suitable chemical additive that reduces and hinders the formation of foam in the composition. Defoamers are known in the art and are typically selected based on other components present in the composition.

When the composition comprises the compatibilizer, the compatibilizer may be any compound or component which modifies, alternatively improves, the wetting of the components in the composition. Examples of such compatibilizers include titanium alcoholates, esters of phosphoric, phosphorous, phosphonic, and silicic acids, metallic salts and esters of aliphatic, aromatic, and cycloaliphatic acids, ethylene/ acrylic or methacrylic acids, ethylene/esters of acrylic or methacrylic acid, ethylene/vinyl acetate resins, styrene/maleic anhydride resins or esters thereof, acrylonitrilebutadiene styrene resins, methacrylate/butadiene styrene resins (MBS), styrene acrylonitrile resins (SAN), and butadieneacrylonitrile copolymers. Alternatively or in addition, the compatibilizer may comprise a silane, e.g. a hydrocarbonoxysilane such as an alkoxysilane, a combination of an alkoxysilane and a hydroxy-functional polyorganosiloxane, an aminofunctional silane, or a combination thereof. The silane may include any functional group, which may be an adhesion-promoting group, such as amino, epoxy, mercapto and/or acrylate groups. Combinations of functional groups may be utilized, e.g. the (D) compatibilizer may comprise an epoxy-functional alkoxysilane. Suitable epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. Examples of suitable epoxy-functional alkoxysilanes include 3-glycidoxypropyltrim ethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Aminofunctional silanes, such as an aminofunctional alkoxysilanes, may have various amino groups, as understood in the art. Other examples of compatibilizers include modified polyethylene and modified polypropylene, which are obtained by modifying polyethylene and polypropylene, respectively, using a reactive group, including polar monomers such as maleic anhydride or esters, acrylic or methacrylic acid or esters, vinylacetate, acrylonitrile, and styrene.

Specific examples of UV stabilizers include phenol, 2-(2H-benzotriazol-2-yl)-6-dodecyl-4-methyl-, branched and linear (TINUVIN® 571). Additional examples of suitable UV stabilizers include bis(1,2,2,6,6-pentamethyl-4-piperidyl) sebacate; methyl 1,2,2,6,6-pentamethyl-4-piperidyl/ sebacate; and a combination thereof (TINUVIN® 272). These and other TINUVIN® additives, such as TINUVIN® 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. An example of an oligomeric antioxidant stabilizer (specifically, hindered amine light stabilizer (HALS)) is Ciba TINUVIN® 622, which is a dimethylester of butanedioic acid copolymerized with 4-hydroxy-2,2,6,6-tetramethyl-l-piperidine ethanol.

If utilized, the antioxidant may be any antioxidant known in the art. Specific examples thereof include phenolic antioxidants and combinations of phenolic antioxidants with stabilizers. Phenolic antioxidants include fully sterically hindered phenols and partially hindered phenols; and sterically hindered amines such as tetramethyl-piperidine derivatives. Suitable phenolic antioxidants include vitamin E and IRGANOX® 1010 from Ciba Specialty Chemicals, U.S.A. IRGANOX® 1010 comprises pentaerythritol tetrakis(3-(3, 5-di-t-butyl-4-hydroxyphenyl)propionate). Additional examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, Camellia sinensis oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/ t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/ cholesteryl phosphate, sodium bisulfite, sodium erythorbate, sodium metabisulfide, sodium sulfite, sodium thioglycolate, sorbityl furfural, tea tree (Melaleuca aftemifolia) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof.

Biocides may be exemplified by fungicides, herbicides, pesticides, antimicrobial agents, or a combination thereof.

Specific examples of fungicides include N-substituted benzimidazole carbamate, benzimidazolyl carbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl) benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl) benzimidazolyl]}carbamate, ethyl N-{2[2-(N -methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N -propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy) benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2 -[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate; 10,10'-oxybisphenoxarsine (which has trade name Vinyzene, OB PA), di-iodomethyl-para-tolylsulfone, benzothiophene-2-cyclohexylcarboxamide-S,S-dioxide, N-(fluordichloridemethylthio)phthalimide (which has trade names Fluor-Folper, and Preventol A3); methyl-benzimideazol-2-ylcarbamate (which has trade names Carbendazim, and Preventol BCM), zinc-bis (2-pyridylthio-l-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-l,2-benzisothiazolin-3-on and/or triazolyl-compounds, such as tebuconazol in combination with zeolites containing silver.

Alternatively, the biocide may comprise a boron containing material, e.g., boric anhydride, borax, or disodium octaborate tetrahydrate; which may function as a pesticide, fungicide, and/or flame retardant.

Specific examples of suitable flame retardants include carbon black, hydrated aluminum hydroxide, and silicates such as wollastonite, platinum and platinum compounds. Alternatively, the flame retardant, if utilized, may be selected from halogen based flame-retardants such as decabromodiphenyloxide, octabromodiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromphenoxy) ethane, bis-(pentabromophenoxy) ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene and PVC. Alternatively, the flame retardant, if utilized, may be selected from phosphorus based flame-retardants such as (2,3-dibromopropyl)-phosphate, phosphorus, cyclic phosphates, triaryl phosphate, bis-melaminium pentate, pentaerythritol bicyclic phosphate, dimethyl methyl phosphate, phosphine oxide diol, triphenyl phosphate, tris-(2-chloroethyl) phosphate, phosphate esters such as tricreyl, trixylenyl, isodecyl diphenyl, ethylhexyl diphenyl, phosphate salts of various amines such as ammonium phosphate, trioctyl, tributyl or tris-butoxyethyl phosphate ester. Other suitable flame retardants may include tetraalkyl lead compounds such as tetraethyl lead, iron pentacarbonyl, manganese methyl cyclopentadienyl tricarbonyl, melamine and derivatives such as melamine salts, guanidine, dicyandiamide, ammonium sulphamate, alumina trihydrate, and magnesium hydroxide alumina trihydrate.

The present invention also provides a method of preparing a film with the composition and the film formed thereby. The method of preparing the film comprises applying the composition on a substrate. The method further comprises forming the film on the substrate from the composition. These steps are described above with respect to the method of preparing the film with the emulsion and apply to preparing the film with the composition as well. Any method steps described above with respect to the emulsion are incorporated by reference herein with respect to the method steps associated with the composition. The composition and resulting film may be utilized in any manner described above with respect to the emulsion. The composition and film have broad applicability in architectural and decorative coating applications as well. Typically, inclusion of the organic binder increases the hardness and durability of the film as compared to the film prepared by the emulsion, which does not include the organic binder. Increased hardness and durability are desirable in certain end use applications, as known in the art.

Embodiment 1 relates to an emulsion, comprising:
a non-aqueous phase, which comprises:
a solid silicone resin; and
a siloxane carrier vehicle capable of carrying the solid silicone resin, the siloxane carrier vehicle having an average of at least one silicon-bonded functional group per molecule;
an aqueous phase comprising water; and
a surfactant;
wherein the emulsion is substantially free from organic solvents.

Embodiment 2 relates to the composition of Embodiment 1, wherein: (i) the solid silicone resin has the general formula $(R^1R^2R^3SiO_{1/2})_w(R^4R^5SiO_{2/2})_x(R^6SiO_{3/2})_y(SiO_{4/2})_z$, where $R^1$-$R^6$ are independently selected from H, OH, substituted or unsubstituted hydrocarbyl groups, alkoxy groups, amino groups, acetoxy groups, and aminoxy groups, and w, x, y and z are independently from ≥0 to ≤1, with the provisos that y and z are not simultaneously 0 and w+x+y+z=1; (ii) the non-aqueous phase comprises the solid silicone resin in an amount of from greater than 0 to 50 weight % based on the total weight of the non-aqueous phase; or (iii) both (i) and (ii).

Embodiment 3 relates to the emulsion of Embodiments 1 or 2, wherein: (i) the siloxane carrier vehicle comprises a resinous silicone; (ii) the non-aqueous phase comprises the siloxane carrier vehicle in an amount of from greater than 50 to less than 100 weight % based on the total weight of the non-aqueous phase; (iii) the at least one silicon-bonded functional group is selected from H, OH, alkoxy groups, alkenyl groups, aminoxy groups and acetoxy groups, alternatively is a silicon-bonded alkoxy group; or (iv) any combination of (i) to (iii).

Embodiment 4 relates to the emulsion of any one of Embodiments 1-3, wherein the silicone resin: (i) comprises an MQ resin, alternatively a trimethylsiloxysilicate resin; (ii) comprises a T resin, alternatively a T-propyl resin; or (iii) a combination of (i) and (ii).

Embodiment 5 relates to the emulsion of any one of Embodiments 1-4, wherein the siloxane carrier vehicle comprises an alkoxy-functional silicone resin, alternatively a methoxy-functional DT silicone resin.

Embodiment 6 relates to the emulsion of any one of Embodiments 1-5, wherein the surfactant comprises an anionic surfactant, alternatively sodium lauryl sulfate.

Embodiment 7 relates to the emulsion of any one of Embodiments 1-6, wherein: (i) the solid silicone resin comprises at least one of an MQ resin and a T resin and is present in the emulsion in an amount of from >5 to <25 wt. % based on the total weight of the non-aqueous phase; and (ii) the siloxane carrier vehicle comprises an alkoxy-functional silicone resin and is present in the emulsion in an amount of from >75 to <95 wt. % based on the total weight of the non-aqueous phase.

Embodiment 8 relates to the emulsion of any one of Embodiments 1-7, wherein: (i) the non-aqueous phase consists essentially of, alternatively consists of, the solid silicone resin, the siloxane carrier vehicle, and optionally the surfactant; (ii) the aqueous phase consists essentially of, alternatively consists of, water and optionally the surfactant; (iii) the surfactant comprises an anionic surfactant; or (iv) any combination of (i) to (iii).

Embodiment 9 relates to the emulsion of any one of Embodiments 1-7, further defined as a coating composition and further comprising a filler, a pigment, a binder, or combinations thereof.

Embodiment 10 relates to a method of preparing the emulsion of Embodiment 1, the method of Embodiment 10 comprising:

combining the solid silicone resin and the siloxane carrier vehicle to give a non-aqueous composition;

combining the non-aqueous composition, water, and the surfactant to give a mixture; and shearing the mixture, thereby preparing the emulsion.

Embodiment 11 relates to the method of Embodiment 11, wherein the non-aqueous composition and the surfactant are first combined to give an initial mixture, and wherein water is combined with the initial mixture to prepare the emulsion.

Embodiment 12 relates to a method of preparing a film. The method of Embodiment 12 comprises:

applying an emulsion on a substrate; and forming the film on the substrate from the emulsion;

wherein the emulsion is the emulsion of Embodiment 1.

Embodiment 13 relates to the method of Embodiment 12, wherein forming the film on the substrate comprises forming a wet film on the substrate, and drying the wet film on the substrate to form the film, wherein drying the wet film comprises (i) evaporating water from the wet film; (ii) exposing the wet film to an elevated temperature to drive water therefrom; (iii) curing the wet film; or (iv) any combination of (i) to (iii).

Embodiment 14 relates to a film formed in accordance with the method of Embodiment 12 or 13.

Embodiment 15 relates to the film of Embodiment 14 having a thickness of from 1 to 50 μm.

Embodiment 16 relates to a composition, comprising:

an emulsion; and an organic binder;

wherein the emulsion is the emulsion of any one of Embodiments 1-8.

Embodiment 17 relates to a method of preparing a film, the method of Embodiment 17 comprising:

applying a composition on a substrate; and forming the film on the substrate from the composition;

wherein the composition is the composition of Embodiment 16.

Embodiment 18 relates to a film formed in accordance with the method of Embodiment 17.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Various emulsions and films are prepared in accordance with the subject disclosure. In particular, 15 different emulsions are prepared in accordance with the subject disclosure and utilized or screened for purposes of preparing 15 different films. Each of the emulsions includes a non-aqueous phase comprising a solid silicone resin and a siloxane carrier vehicle, an aqueous phase, and a surfactant.

To prepare the different emulsions, the solid silicone resin is first combined with the siloxane carrier vehicle to form a non-aqueous composition. Table 1 below illustrates the components utilized to prepare two different non-aqueous compositions, along with their respective amounts, which are ultimately utilized to prepare the 15 emulsions.

TABLE 1

| Synthesis Example | Solid Silicone Resin | Amount (wt. %) | Siloxane Carrier Vehicle | Amount (wt. %) |
|---|---|---|---|---|
| SE1 | Solid Silicone Resin 1 | 20 | Siloxane Carrier Vehicle 1 | 80 |
| SE2 | Solid Silicone Resin 2 | 20 | Siloxane Carrier Vehicle 1 | 80 |

Solid Silicone Resin 1 is a solid MQ resin (trimethylsiloxysilicate resin) having average formula $M^{(Me3)}_{43}Q_{57}$, where Me indicates methyl.

Solid Silicone Resin 2 is a solid combination of MQ and T-propyl silicone resin. In particular, Solid Silicone Resin 2 comprises a blend of 63 wt. % Solid Silicone Resin 1 and 37 wt. % T-propyl resin.

Siloxane Carrier Vehicle 1 is an alkoxy-functional silicone resin having average formula $T^{Me}_{83}T^{Oct}_{2}D^{Me2}_{16}$ where Me indicates methyl and Oct indicates octyl.

Each non-aqueous composition (150 g) is then combined with the surfactant (sodium lauryl sulfate, 15 g) and water (80 g) to form a mixture. Each mixture is then sheared to form the different emulsions. More specifically, each non-aqueous composition is combined with 15 g of the surfactant (sodium lauryl sulfate) and mixed. Water is added incrementally (20 g, 20 g, and 40 g) with mixing via a dental mixer at 2750 rpm for 1 minute after each incremental addition of water to form each emulsion. The emulsion of Synthesis Example 1 is then characterized by its particle size, pH, and nonvolatile content (NVC). Particle size is measured via a dynamic light scattering technique.

TABLE 2

| Synthesis | Particle size | | | | |
|---|---|---|---|---|---|
| Example | D10 | D50 | D90 | pH | NVC |
| SE1 | 0.19 μm | 1.92 μm | 3.45 μm | 8.5 | 61.93% |

In Practical Examples 1-15 below, the emulsions of Synthesis Examples 1 and 2 are optionally combined with another emulsion, an additive package, and/or a catalyst. Comparative Example 1 is the other emulsion, as described in further detail below. Table 3 below illustrates the components utilized to prepare the emulsions of Practical Examples 1-15 and Comparative Example 1.

TABLE 3

| | SE1 (wt. %) | SE2 (wt. %) | Commercially Available Emulsion 1 (wt. %) | Additive Package 1 (wt. %) | Catalyst 1 (% wt.) |
|---|---|---|---|---|---|
| Comparative Example 1 | — | — | 100 | — | — |
| Practical Example 1 | 100 | — | — | — | — |
| Practical Example 2 | 10 | — | 90 | — | — |
| Practical Example 3 | 25 | — | 75 | — | — |
| Practical Example 4 | 2 | — | 8 | 90 | — |
| Practical Example 5 | — | 10 | 90 | — | — |
| Practical Example 6 | — | 25 | 75 | — | — |
| Practical Example 7 | 95 | — | — | — | 5 |
| Practical Example 8 | 9 | — | 86 | — | 5 |
| Practical Example 9 | 24 | — | 71 | — | 5 |
| Practical Example 10 | — | 95 | — | — | 5 |
| Practical Example 11 | — | 9 | 86 | — | 5 |
| Practical Example 12 | — | 24 | 71 | — | 5 |
| Practical Example 13 | 20 | — | 60 | 20 | — |
| Practical Example 14 | — | 20 | 60 | 20 | — |
| Practical Example 15 | — | 40 | 40 | 20 | — |

Commercially Available Emulsion 1 is an emulsion of a C30-C45 alkyldimethylsilyl polypropylsilsesquioxane wax resin in water (50 wt. % water), emulsified via the surfactant (sodium lauryl sulfate).

Additive Package 1 comprises 40 wt. % water, 40 wt. % iron oxide black, and 20 wt. % mica.

Catalyst 1 is a 50 wt. % solids aqueous emulsion of an organotin catalyst.

The respective emulsions of Practical Examples 1-15, and also Comparative Example 1, are each applied to a surface of a substrate via a drawn down applicator. In particular, these emulsions are applied to glass and metal substrates via a Baker Film Applicator from Labomat in accordance with ASTM D823. Once the respective emulsions were applied to the substrates, the emulsions were cured at 100° C. for 1 hour to form films on the substrates (although, as described below, some of the emulsions did not form films). Practical Example 3 was also alternatively cured at room temperature (ambient conditions, 24 hours).

The cured emulsions, or films, were evaluated. In particular, each cured emulsion was manually touched and evaluated for dry-touch contact. In Table 4 below, "OK" indicates a dry film, whereas "KO" indicates a tacky film.

Physical properties of the films formed with the emulsions are measured. In particular, physical properties of the respective films are measured via subjecting the films to pendulum hardness, delamination, and solvent resistance tests, as described below.

The pendulum hardness of each of the films is measured via a Hardness Pendulum Persoz Tester SP0500 from Labomat in accordance with ISO1522.

The delamination of each of the films is measured via a cross-cut test in accordance with ASTM D3352.

The solvent resistance of each of the films is measured via methyl ethyl ketone rub tests in accordance with ASTM D4752.

Table 4 below illustrated the results of the film-formation evaluation, and the pendulum hardness, delamination, and solvent resistance tests.

TABLE 4

| Example | Film | Hardness | Delamination >600° C. | Delamination <600° C. | Solvent Resistance |
|---|---|---|---|---|---|
| Comparative Example 1 | OK | <10 | >50% | — | >80 |
| Practical Example 1 | KO | — | >100% | — | — |
| Practical Example 2 | OK | — | — | — | — |
| Practical Example 3 | OK | 27 | — | — | >80 |
| Practical Example 3 (RT) | OK | 30 | — | — | >80 |
| Practical Example 4 | OK | — | <5% | 0% | — |

TABLE 4-continued

| Example | Film | Hardness | Delamination >600° C. | Delamination <600° C. | Solvent Resistance |
|---|---|---|---|---|---|
| Practical Example 5 | OK | 23 | — | — | — |
| Practical Example 6 | OK | 13 | — | — | — |
| Practical Example 7 | OK | 19 | — | — | — |
| Practical Example 8 | OK | 28 | — | — | — |
| Practical Example 9 | OK | 29 | — | — | — |
| Practical Example 10 | OK | 16 | — | — | — |
| Practical Example 11 | OK | 24 | — | — | — |
| Practical Example 12 | OK | 11 | — | — | — |
| Practical Example 13 | OK | 31 | 0% | <5% | >80 |
| Practical Example 14 | OK | 10 | <5% | <5% | 10 |
| Practical Example 15 | KO | — | 100% | — | — |

Three additional emulsions and films are prepared in accordance with the subject disclosure. Each of the emulsions includes a non-aqueous phase comprising a solid silicone resin and a siloxane carrier vehicle, an aqueous phase, and a surfactant.

To prepare the different emulsions, the solid silicone resin is first combined with the siloxane carrier vehicle to form a non-aqueous composition. Table 5 below illustrates the components utilized to prepare the different non-aqueous compositions, along with their respective amounts.

TABLE 5

| Synthesis Example | Solid Silicone Resin | Amount (wt. %) | Siloxane Carrier Vehicle | Amount (wt. %) |
|---|---|---|---|---|
| SE3 | Solid Silicone Resin 1 | 20 | Siloxane Carrier Vehicle 1 | 80 |
| SE4 | Solid Silicone Resin 1 | 10 | Siloxane Carrier Vehicle 1 | 90 |
| SE5 | Solid Silicone Resin 2 | 20 | Siloxane Carrier Vehicle 1 | 80 |

Each non-aqueous composition (15 g) is then combined with the surfactant (sodium lauryl sulfate, 1.5 g) and water (1.5 g) to form a mixture. Each mixture is then sheared. Water is added incrementally with mixing via a dental mixer at 3540 rpm for 1 minute after each incremental addition of water to form each emulsion having a 50 wt. % actives content.

In Practical Examples 16-18 below, 2.5 grams of the emulsions of Synthesis Examples 3-5 are combined with 2.5 grams of a 4% thickener solution (Aculyne™ 28, commercially available from The Dow Chemical Company of Midland, Mich.) at a pH of 7 and a bis-triethanolamine titanium complex catalyst to give a catalyst content of 5 wt. %.

Three additional Comparative Examples (Comparative Examples 2-4) are also prepared. Comparative Example 2 is the same as Practical Examples 16-18 but does not include any solid silicone resin. Instead, the emulsion of Comparative Example 2 merely comprises the Siloxane Carrier Vehicle 1, the surfactant, and water (the emulsion of Comparative Example 2 having a 50 wt. % actives content). Comparative Example 3 includes only the Siloxane Carrier Vehicle 1, not as an emulsion (i.e., without water, the solid silicone resin, and the surfactant). Finally, Comparative Example 4 is formed by combining 2 grams of the emulsion of Comparative Example 2, 0.5 grams of colloidal silica, 2.5 grams of the 4% thickener solution, and a bis-triethanolamine titanium complex catalyst to give a catalyst content of 4.7 wt. %.

The respective emulsions of Practical Examples 16-18, and also Comparative Examples 2-4, are each applied to a surface of a substrate via a drawn down applicator. In particular, these emulsions are applied to glass and metal substrates via a Baker Film Applicator from Labomat in accordance with ASTM D823. Once the respective emulsions were applied to the substrates, the emulsions were cured at room temperature (ambient conditions, 24 hours) to give films.

Hardness of each film was measured in accordance with the method described above. Table 6 below indicates the hardness of each film formed in Practical Examples 16-18 and Comparative Examples 2-4 after 1 day and after 15 days upon continued exposure to ambient conditions.

TABLE 6

| | Hardness | |
|---|---|---|
| Example | 1 day | 15 days |
| Practical Example 16 | 33 | 96 |
| Practical Example 17 | 79 | 98 |
| Practical Example 18 | 25 | 86 |
| Comparative Example 2 | 43 | 63 |
| Comparative Example 3 | 98 | 116 |
| Comparative Example 4 | 33 | 64 |

In Practical Example 19, a composition is prepared with the emulsion of Practical Example 6. Table 7 below sets forth the components utilized to prepare the composition, along with the respective amounts of the components. The values in Table 7 are parts by weight based on 100 parts by weight of the composition.

TABLE 7

| Example | Emulsion of Practical Example 6 | Organic Binder 1 | Catalyst 2 |
|---|---|---|---|
| Practical Example 19 | 85 | 10 | 5 |

Organic Binder 1 is a water-based acrylic copolymer.

Catalyst 2 is a triethanolamine titanium complex.

The composition of Practical Example 19, as well as the emulsion of Practical Example 6, are applied to substrates to give films. The films are prepared in the same manner as described above with respect to Practical Examples 1-15 in accordance with ASTM D823.

Physical properties are measured of the film formed from the composition of Practical Example 19 and the film formed from the emulsion of Practical Example 6. Table 8 below sets forth the physical properties of the film formed from the composition of Practical Example 19 and the film formed from emulsion of Practical Example 6.

TABLE 8

| Example | Hardness | MEK test | WCA |
| --- | --- | --- | --- |
| Practical Example 19 | 104 | 100 | 104 |
| Emulsion of Practical Example 6 | 14 | 70 | 94 |

Hardness is measured in the same manner as set forth above.

The MEK test is carried out in accordance with EN 13523-11 (Part 11) (2004) and involves evaluating the resistance of the film on the substrate to MEK and other solvents.

Water contact angle (WCA) is measured in accordance with ASTM D7334.

As illustrated in Table 8 above, the film formed with the composition of Practical Example 19 had significantly improved hardness as compared with the film formed with the emulsion of Practical Example 6.

In Practical Examples 20 and 21, additional compositions are prepared with the emulsion of Practical Example 6. Table 9 below sets forth the components utilized to prepare the compositions of Practical Examples 20 and 21, along with the respective amounts of the components. The values in Table 9 are parts by weight based on 100 parts by weight of each composition.

TABLE 9

| Example | Emulsion of Practical Example 6 | Organic Binder 2 |
| --- | --- | --- |
| Practical Example 20 | 5 | 95 |
| Practical Example 21 | 10 | 90 |

Organic binder 2 is a water-based acrylic emulsion.

The composition of Practical Examples 20 and 21 are applied to substrates to give films. The films are prepared in the same manner as described above with respect to Practical Examples 1-15 in accordance with ASTM D823.

Water contact angles are measured of the films formed from the compositions of Practical Examples 20 and 21. Table 10 below sets forth the water contact angles of the films formed from the compositions of Practical Examples 20 and 21. Water contact angle (WCA) is measured in accordance with ASTM D7334.

TABLE 10

| Example | WCA |
| --- | --- |
| Practical Example 20 | 84.8 |
| Practical Example 21 | 98.1 |

As illustrated in Table 10 above, increased loadings of the emulsion in the composition increases WCA.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. An emulsion, comprising:
a non-aqueous phase, which comprises:
a solid silicone resin; and
a siloxane carrier vehicle capable of carrying said solid silicone resin, said siloxane carrier vehicle comprising a resinous silicone and having an average of at least one silicon-bonded functional group per molecule;
an aqueous phase comprising water; and
a surfactant;
wherein said emulsion is substantially free from organic solvents.

2. The emulsion of claim 1, wherein: (i) said solid silicone resin has the general formula $(R^1R^2R^3SiO_{1/2})_w(R^4R^5SiO_{2/2})_x(R^6SiO_{3/2})_y(SiO_{4/2})_z$, where $R^1$-$R^6$ are independently selected from H, OH, substituted or unsubstituted hydrocarbyl groups, alkoxy groups, amino groups, acetoxy groups, and aminoxy groups, and w, x, y and z are independently from $\geq 0$ to $\leq 1$, with the provisos that y and z are not simultaneously 0 and w+x+y+z=1; (ii) said non-aqueous phase comprises said solid silicone resin in an amount of from greater than 0 to 50 weight % based on the total weight of said non-aqueous phase; or (iii) both (i) and (ii).

3. The emulsion of claim 1 or 2, wherein: (i) said non-aqueous phase comprises said siloxane carrier vehicle in an amount of from greater than 50 to less than 100 weight % based on the total weight of said non-aqueous phase; (ii) said at least one silicon-bonded functional group is selected from H, OH, alkoxy groups, alkenyl groups, aminoxy groups and acetoxy groups, alternatively is a silicon-bonded alkoxy group; or (iii) both (i) and (ii).

4. The emulsion of any one preceding claim, wherein said solid silicone resin: (i) comprises an MQ resin; (ii) comprises a T resin; or (iii) a combination of (i) and (ii).

5. The emulsion of claim 1, wherein said siloxane carrier vehicle comprises an alkoxy-functional silicone resin, alternatively a methoxy-functional DT silicone resin.

6. The emulsion of claim 1, wherein said surfactant comprises an anionic surfactant, alternatively sodium lauryl sulfate.

7. The emulsion of claim 1, wherein: (i) said solid silicone resin comprises at least one of an MQ resin and a T resin and is present in said emulsion in an amount of from >5 to <25 wt. % based on the total weight of said non-aqueous phase; and (ii) said siloxane carrier vehicle comprises an alkoxy-functional silicone resin and is present in said emulsion in an amount of from >75 to <95 wt. % based on the total weight of said non-aqueous phase.

8. The emulsion of claim 1, wherein: (i) said non-aqueous phase consists essentially of, alternatively consists of, said solid silicone resin, said siloxane carrier vehicle, and optionally said surfactant; (ii) said aqueous phase consists essentially of, alternatively consists of, water and optionally said surfactant; (iii) said surfactant comprises an anionic surfactant; or (iv) any combination of (i) to (iii).

9. The emulsion of claim 1, further defined as a coating composition and further comprising a filler, a pigment, a binder, or combinations thereof.

10. A method of preparing the emulsion of claim 1, said method comprising:
combining said solid silicone resin and said siloxane carrier vehicle to give a non-aqueous composition;
combining the non-aqueous composition, water, and the surfactant to give a mixture; and
shearing the mixture, thereby preparing the emulsion.

11. The method of claim 10, wherein the non-aqueous composition and the surfactant are first combined to give an initial mixture, and wherein water is combined with the initial mixture to prepare the emulsion.

12. A method of preparing a film, said method comprising:
  applying an emulsion on a substrate; and
  forming the film on the substrate from the emulsion;
  wherein the emulsion is the emulsion of claim 1.

13. The method of claim 12, wherein forming the film on the substrate comprises forming a wet film on the substrate, and drying the wet film on the substrate to form the film, wherein drying the wet film comprises (i) evaporating water from the wet film; (ii) exposing the wet film to an elevated temperature to drive water therefrom; (iii) curing the wet film; or (iv) any combination of (i) to (iii).

14. A film formed in accordance with the method of claim 12.

15. The film of claim 14 having a thickness of from 1 to 50 μm.

16. A composition, comprising:
  an emulsion; and
  an organic binder;
  wherein the emulsion is the emulsion of claim 1.

17. A method of preparing a film, said method comprising:
  applying a composition on a substrate; and
  forming the film on the substrate from the composition;
  wherein the composition is the composition of claim 16.

18. A film formed in accordance with the method of claim 17.

* * * * *